(12) United States Patent
Persson

(10) Patent No.: US 8,764,876 B2
(45) Date of Patent: Jul. 1, 2014

(54) PCBN MATERIAL, TOOL ELEMENTS COMPRISING SAME AND METHOD FOR USING SAME

(75) Inventor: Stefan Magnus Olof Persson, Umeå (SE)

(73) Assignee: Element Six Limited, County Clare (IE)

(*) Notice: Subject to any disclaimer, the term of this patent is extended or adjusted under 35 U.S.C. 154(b) by 0 days.

(21) Appl. No.: 13/807,413

(22) PCT Filed: Jul. 6, 2011

(86) PCT No.: PCT/EP2011/061384
§ 371 (c)(1),
(2), (4) Date: Mar. 6, 2013

(87) PCT Pub. No.: WO2012/004294
PCT Pub. Date: Jan. 12, 2012

(65) Prior Publication Data
US 2013/0213197 A1   Aug. 22, 2013

Related U.S. Application Data

(60) Provisional application No. 61/362,939, filed on Jul. 9, 2010.

(30) Foreign Application Priority Data

Jul. 9, 2010  (GB) .................................. 1011574.9

(51) Int. Cl.
| C04B 35/5831 | (2006.01) |
| C22C 29/14 | (2006.01) |
| C22C 29/16 | (2006.01) |
| B26D 1/00 | (2006.01) |
| C22C 26/00 | (2006.01) |

(52) U.S. Cl.
CPC ....... *C04B 35/5831* (2013.01); *C22C 2026/003* (2013.01); *B26D 1/00* (2013.01); *C22C 26/00* (2013.01)
USPC ............... 75/238; 501/96.4; 51/307; 51/309; 428/570

(58) Field of Classification Search
CPC .............. C04B 14/327; C04B 35/5831; C04B 35/6229; C04B 41/5064; C22C 1/051; C22C 1/1068; C22C 26/00; C22C 29/16; C22C 32/0005; C22C 32/0068; C22C 33/0292
USPC .............. 75/228–250; 501/96.4; 51/307–309, 51/293; 428/544–686
See application file for complete search history.

(56) References Cited

U.S. PATENT DOCUMENTS

| 4,219,339 A | 8/1980 | Wilson |
| 4,666,466 A | 5/1987 | Wilson |

(Continued)

FOREIGN PATENT DOCUMENTS

| CN | 101891481 A | 11/2010 |
| EP | 0816304 A2 | 7/1998 |

(Continued)

*Primary Examiner* — Scott Kastler
*Assistant Examiner* — Vanessa Luk
(74) *Attorney, Agent, or Firm* — Bryan Cave LLP

(57) ABSTRACT

PCBN material consisting essentially of cubic boron nitride (cBN) grains and binder material, the content of the cBN grains being at least 80 weight percent of the PCBN material; the binder material comprising greater than 50 weight percent Al and a combined content of at least 5 weight percent of an iron group element and a refractory element, the iron group element selected from the group consisting of Co, Fe, Ni and Mn, and the refractory element selected from the group consisting of W, Cr, V, Mo, Ta, Ti, Hf and Zr.

18 Claims, 1 Drawing Sheet

(56) References Cited

U.S. PATENT DOCUMENTS

Figure 1:
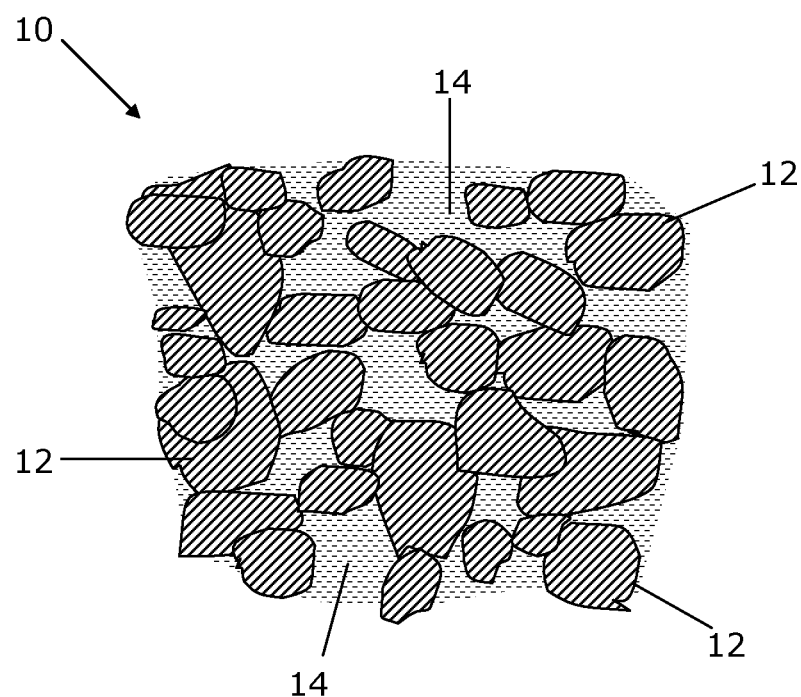

| | | | |
|---|---|---|---|
| 6,001,758 A | 12/1999 | Fukaya et al. | |
| 8,481,145 B2 * | 7/2013 | Ohtomo | 428/143 |

FOREIGN PATENT DOCUMENTS

| EP | 1006093 A1 | 7/2000 |
|---|---|---|
| EP | 2266730 A1 | 12/2010 |
| JP | 54102316 A | 8/1979 |
| JP | 54127412 A | 10/1979 |
| JP | 56009280 A | 1/1981 |
| JP | 60184650 A | 9/1985 |
| JP | 60230956 A | 11/1985 |
| JP | 61142003 A | 6/1986 |
| JP | 2282443 A | 11/1990 |
| JP | 201179508 A | 7/2001 |
| SU | 1067082 A | 5/1980 |
| WO | 2007/049140 A2 | 5/2007 |
| WO | 2009/116610 A1 | 9/2009 |

* cited by examiner

PCBN MATERIAL, TOOL ELEMENTS COMPRISING SAME AND METHOD FOR USING SAME

This disclosure relates to generally to PCBN material and tool elements comprising same, particularly but not exclusively for machining workpieces comprising metal.

Polycrystalline cubic boron nitride (PCBN) material is an example of a polycrystalline superhard material, which may have Vickers hardness of at least about 28 GPa. PCBN material may be made by sintering grains of cubic boron nitride (cBN) at an ultra-high pressure of several GPa. Machine tools may be made from discs of PCBN materials by cutting the discs into small segments by means of laser or electro-discharge machining (EDM) devices, and brazing the segments onto a tool or a component for a tool, such as an insert, tip or bit. The segments may be further processed by mechanical grinding or EDM to form a precision cutting edge. The tools may be indexable inserts or rotary machine tools. PCBN material may be particularly advantageous for machining ferrous metal workpieces. A disadvantage of PCBN tools is that the PCBN material may tend to fracture and chip, or wear prematurely, particularly when used in interrupted machining of workpieces.

U.S. Pat. No. 7,524,785 discloses a cubic boron nitride (cBN) sintered body, which contains cubic boron nitride particles and a bonding material for bonding the cBN particles to one another, provided with: cBN particles contained in a range from 70 volume % to 98 volume %; and a residual bonding material constituted by a Co compound, an Al compound and WC and a solid solution of these.

Japan patent number 61-142003 discloses a compound cutter composed of a multiple crystal sintered body made of cBN and a cemented carbide substrate. The multiple crystal sintered body consists of cBN of which amount is 70%-95%, the remainder being binding material made of metallic ingredient. The binding material may comprise Mo, and any of Ni, Co, and Fe, and Al.

There is a need for PCBN material having enhanced fracture resistance and for tool elements comprising same, particularly for machining hard-to-machine iron and steel material.

Viewed from a first aspect there is provided PCBN material consisting essentially of cBN grains and binder material; the content of the cBN grains being at least about 80 weight percent or at least about 85 weight percent of the PCBN material; the binder material comprising greater than about 50 weight percent Al, at least about 60 weight percent Al, or at least about 70 weight percent Al; and a combined content of an iron group element and a refractory element of least about 5 weight percent, at least about 10 weight percent, at least about 20 weight percent or at least about 25 weight percent; the iron group element selected from the group consisting of Co, Fe, Ni and Mn, and the refractory element selected from the group consisting of W, Cr, V, Mo, Ta, Ti, Hf and Zr; or the refractory element selected from the group consisting of W, Cr, V, Mo, Nb, Ta, Ti, Hf and Zr. In one example, the refractory element may be selected from the group consisting of W, Cr, V, Ta, Ti, Hf and Zr. The iron group element or refractory element may be in unreacted form, or comprised in an alloy or a compound.

Various example PCBN materials having various compositions, microstructures and constituents are envisaged by the disclosure. For example, PCBN material may comprise a mass of cBN grains (i.e. an agglomeration comprising a plurality of grains) dispersed within a binder material (i.e. constituent material of PCBN other than the cBN), in which the content of cBN is at least about 50 volume percent of the PCBN material. The cBN grains may have a mean size of at least about 5 microns and at most about 20 microns. In one example, PCBN material may comprise at least about 86 weight percent cBN. The binder material in example PCBN materials may have various compositions and combinations of constituent materials. For example, the binder material may comprise at most about 95 weight percent Al, at most about 92 weight percent Al or at most about 90 weight percent Al, and in one example, the iron group element may be Co and the refractory element may be W. In a particular variant, the binder material may comprise at least about 70 weight percent Al and less than about 95 weight percent Al, and a combined content of Co and W of least about 5 weight percent and at most about 30 weight percent. In some examples, the binder material may comprise at least about 1 weight percent Co or at least about 2 weight percent Co, and at most about 15 weight percent Co or at most about 12 weight percent Co. In some examples, the binder material may comprise at least about 1 weight percent W, at least about 5 weight percent W or at least about 6 weight percent W, and in some embodiments, the binder material may comprise at most about 25 weight percent W or at most about 20 weight percent W. The molar ratio of the iron group element to the refractory element may be at least about 1 to 1, or at least about 1.5 to 1, and at most about 3 to 1 or at most about 2.5 to 1. In one particular example, the molar ratio of the iron group element to the refractory element may be about 2 to 1.

Example PCBN material may consist essentially of cBN, Al, the iron group element and the refractory element. In other examples, the binder material may include aluminium nitride or tungsten boride, which may be present as solid particles dispersed within the binder, or may be present in solid solution. In some arrangements, the binder material may include a compound comprising W and B, such as $W_2B_5$ and $B_2W$. In one example PCBN material, the binder material may be substantially free of $AlB_2$ (aluminium diboride).

Viewed from a second aspect, there can be provided a tool element for machining a workpiece, the tool element comprising PCBN material comprising a PCBN structure comprising PCBN material as disclosed and joined to a cemented carbide substrate. For example, the tool element may be an indexable insert for a machine tool.

Viewed from a third aspect, there can be provided a method of using disclosed PCBN material, the method including providing a tool element as disclosed and using the tool element for machining (for example cutting) a workpiece. The workpiece may comprise cast iron having relatively high chrome content of at least about 10 weight percent Cr, and or the workpiece may comprise high manganese iron or steel, which may be as difficult to machine as high-chrome cast irons. High chrome cast iron may contain up to about 20 weight percent or up to 30 weight percent chrome. High manganese iron and steel may contain at least about 12 weight percent and at most about 20 weight percent manganese.

Various machining applications are envisaged for the method. For example, the method may include rough turning a large tool steel roll, as may be used in steel mills for example; or for milling hardened steels such as hot- or cold-work tool steels for forging dies and injection or casting molds; or for turning and profiling tungsten carbide rolls for crushing and rolling applications. The method may include using the tool element for interrupted cutting, turning, milling or boring high-chrome or white cast irons ("White cast iron" is a term derived from the colour of the fracture surface of very hard cast irons, such as high-Cr irons). The workpiece may comprise large primary carbide particles in a matrix of martensite and may be extremely abrasive. The method may be used to machine cast components for impellors and casings for large slurry and water pumps, which may be up to four meters in diameter, or for mineral processing equipment such as equipment for crushing rock or ore. The castings or other workpieces may contain porosity, slag (ceramic waste material) and sand and impose a severe interruption to the cutting tool.

To be cost-effective, cutting tools used for the above applications are likely to need to exhibit high abrasion resistance as well as good toughness and thermal shock resistance. Disclosed example PCBN material has the aspect of having good hot hardness, good abrasion resistance and sufficient toughness, which is likely to result in extended and more reliable working life. The disclosed PCBN material and tools may have the aspect of enhanced strength, particularly edge strength. If the content of Al in the binder is substantially less than about 50 weight percent, then the wear or fracture resistance of the PCBN material may not be sufficient. If the content of Al in the binder is substantially greater than about 98 weight percent, then the wear or fracture resistance of the PCBN material may not be substantially enhanced, particularly when used in interrupted machining of a workpiece comprising a ferrous material. If the combined content of the iron group element and the refractory element is substantially less than about 5 weight percent of the binder material, then the wear resistance of the PCBN material may not be substantially enhanced.

Figure 2:
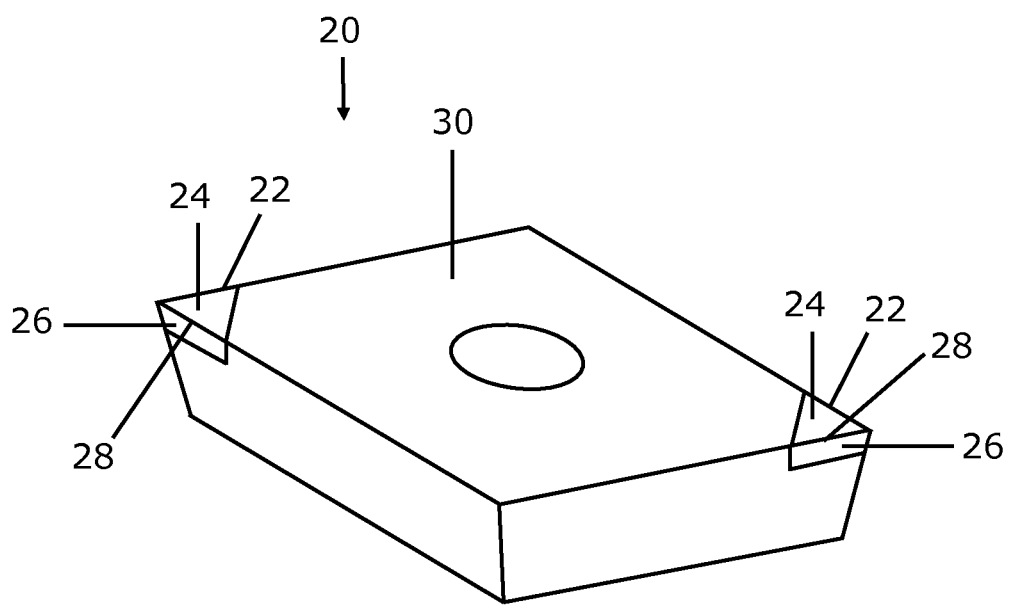

Non-limiting example arrangements will now be described with reference to the accompanying drawings, of which:

FIG. 1 shows a schematic drawing of the microstructure of an example PCBN material, and FIG. 2 shows a schematic perspective view of an example tool element for machining a metal workpiece.

With reference to FIG. 1, example PCBN material 10 comprises a mass of grains 12 of a cBN and interstices 14 between the cBN grains 12, which are substantially filled with binder material, the content of the cBN grains 12 being at least about 50 percent of the material by volume.

With reference to FIG. 2, an example tool element 20 for machining a metal workpiece (not shown) comprises a pair of cutter structures 22 formed of PCBN material joined to a substrate body 30, which may be mounted onto a tool body (not shown). The cutter structures 22 comprise respective rake faces 24, flanks 26 and cutting edges 28, each cutting edge 28 defined by an edge of the rake face 24.

An example PCBN disc may be made by sintering a blend of powders comprising about 86 weight % cBN grains and a binder material comprising about 70.0 weight % Al, 11.7 weight % Co and 18.3 weight % W. The molar ratio of Co to W may be 2 to 1. The cBN grains may have a mean size, in terms of equivalent circle diameter, in the range from about 5 microns to about 20 microns. The powders may be blended dry and sintered at an ultra-high pressure of about 5 GPa and a temperature of about 1,300 degrees centigrade, as is known in the art, to form a disc of PCBN. The disc may then be cut and processed to form inserts or other machine tool elements for machining metal.

Non-limiting examples are described in more detail below. A summary of the compositions of the example PCBN materials and of reference PCBN materials, as well as measures of the respective lives of the samples in a test are summarised in the table below.

| | Life, no. of passes | Al, wt. % | Co, wt. % | W, wt. % |
|---|---|---|---|---|
| Example 1 | 28 | 70.0% | 11.7% | 18.3% |
| Example 2 | 28 | 90.0% | 3.9% | 6.1% |
| Example 3 | 23 | 95.0% | 2.0% | 3.0% |
| Example 4: for comparison | 18 | 50.0% | 19.5% | 30.5% |
| Example 5: Reference PCBN | 19 | 100% | 0% | 0% |

EXAMPLE 1

A PCBN disc was manufactured by sintering a blend of powders comprising 86 weight % cBN grains and a binder material comprising 70.0 weight % Al, 11.7 weight % Co and 18.3 weight % W. The molar ratio of Co to W was 2:1. The cBN grains had a mean size, in terms of equivalent circle diameter, in the range from about 12 microns to about 17 microns. The powders were blended dry by means of a Turbula® mixer and sintered at an ultra-high pressure of about 5 GPa and a temperature of about 1,300 degrees centigrade, as is known in the art, to form a disc of PCBN.

The PCBN disc was cut and processed as is known in the art, to form inserts for machining metal. The inserts were subjected to a machining test, which involved machining a workpiece comprising A61 high chrome iron material at a cutting speed of 75 m/min using a feed rate of 0.2 mm/revolution and a depth of cut of 1 mm. The hardness of the workpiece was checked and found to be about 60 HRc. The workpiece had been prepared with holes or grooves formed into it so that the test would simulate an interrupted cutting operation, in which the cutter insert repeatedly impacts workpiece material, cuts it and is then released from the workpiece material as it encounters a hole or groove. This is a very aggressive test designed to simulate operating conditions in certain applications often encountered in use.

The PCBN inserts failed after an average of about 28 passes over the workpiece.

EXAMPLE 2

A PCBN disc was manufactured by sintering a blend of powders comprising 86 weight % cBN grains and a binder material comprising 90.0 weight % Al, 3.9 weight % Co and 6.1 weight % W. The molar ratio of Co to W was 2:1. The cBN grains had a mean size, in terms of equivalent circle diameter, in the range from about 12 microns to about 17 microns. The powders were blended dry by means of a Turbula® mixer and sintered at an ultra-high pressure of about 5 GPa and a temperature of about 1,300 degrees centigrade, as is known in the art, to form a disc of PCBN.

The PCBN disc was cut and processed to form inserts for machining metal, which were subjected to a machining test as described in Example 1. The PCBN inserts failed after an average of about 28 passes over the workpiece.

EXAMPLE 3

PCBN disc was manufactured by sintering a blend of powders comprising 86 weight % cBN grains and a binder material comprising 95.0 weight % Al, 2.0 weight % Co and 3.0 weight % W. The molar ratio of Co to W was 2:1. The cBN grains had a mean size, in terms of equivalent circle diameter, in the range from about 12 microns to about 17 microns. The powders were blended dry by means of a Turbula® mixer and sintered at an ultra-high pressure of about 5 GPa and a temperature of about 1,300 degrees centigrade, as is known in the art, to form a disc of PCBN.

The PCBN disc was cut and processed to form inserts for machining metal, which were subjected to a machining test as described in Example 1. The PCBN inserts failed after an average of about 23 passes over the workpiece.

EXAMPLE 4

For comparison, a PCBN disc was manufactured by sintering a blend of powders comprising 86 weight % cBN grains and a binder material comprising 50.0 weight % Al, 19.5 weight % Co and 30.5 weight % W. The molar ratio of Co to W was 2:1. The cBN grains had a mean size, in terms of equivalent circle diameter, in the range from about 12 microns to about 17 microns. The powders were blended dry by means of a Turbula® mixer and sintered at an ultra-high pressure of about 5 GPa and a temperature of about 1,300 degrees centigrade, as is known in the art, to form a disc of PCBN.

The PCBN disc was cut and processed to form an insert for machining metal, which was subjected to a machining test as described in Example 1. The PCBN insert failed after 18 passes over the workpiece.

EXAMPLE 5

For comparison, a PCBN disc was manufactured by sintering a blend of powders comprising 86 weight % cBN grains and a binder material comprising 100.0 weight % Al, no Co and no W. The cBN grains had a mean size, in terms of equivalent circle diameter, in the range from about 5 microns to about 20 microns. The powders were blended dry by means of a Turbula® mixer and sintered at an ultra-high pressure of about 5 GPa and a temperature of about 1,300 degrees centigrade, as is known in the art, to form a disc of PCBN.

The PCBN disc was cut and processed to form an insert for machining metal, which was subjected to a machining test as described in Example 1. The PCBN insert failed after 19 passes over the workpiece.

Certain terms and concepts as used herein are briefly explained below.

A machine tool is a powered mechanical device, which may be used to manufacture components comprising materials such as metal, composite materials, wood or polymers by machining, which is the selective removal of material from a body, called a workpiece. A cutter insert may be attached to a machine tool to engage and cut the workpiece. A rake face of a cutter insert is the surface or surfaces over which the chips from the workpiece flow, the rake face directing the flow of newly formed chips. Chips are the pieces of a body removed from the work surface of the body by a machine tool in use. The flank of a cutter insert is the surface that passes over the machined surface produced on the body by the cutter insert. The flank may provide a clearance from the body and may comprise more than one flank face. A cutting edge is the edge of a rake face intended to perform cutting of a body.

In rough machining operations, the feed rate and depth of cut are relatively high and the load on the cutting edge of the tool is high, often in the range of about 5 to 10 kN. Rough machining is frequently undertaken on workpieces which include an "interrupt" aspect, which may be intentional or unintentional. For example, an interrupt may be in the form of a "V" groove or porosity from gases evolved during casting, slag or sand particles. In rough machining, dimensional tolerance is not as critical as in finishing operations and flank wear values up to and in excess of 1 mm may be permitted. Consequently, it is likely that chip resistance rather than wear is the dominant failure mode in rough machining.

Slag is the ceramic waste material that may form on the surface of molten metal. It can become entrapped in the casting, often at or near the surface. It can be abrasive and may comprise metal oxide, which is likely to be detrimental to tool wear and present a load of varying magnitude on the cutting edge As used herein, a material that "consists essentially of" certain constituents means that the material consists of the constituents apart from minor amounts of unavoidable impurities.

The size of grains may be expressed in terms of equivalent circle diameter (ECD). The equivalent circle diameter (ECD) of a particle is the diameter of a circle having the same area as a cross section through the particle. The ECD size distribution and mean size of a plurality of particles may be measured for individual, unbonded particles or for particles bonded together within a body, by means of image analysis of a cross-section through or a surface of the body.

The invention claimed is:

1. PCBN material consisting essentially of cubic boron nitride (cBN) grains and binder material, the content of the cBN grains being at least about 80 weight percent of the PCBN material; the binder material comprising greater than about 50 weight percent Al, at least 1 weight percent W and at most 25 weight percent W, and a combined content of at least about 5 weight percent of an iron group element and W, the iron group element selected from the group consisting of Co, Fe, Ni and Mn.

2. PCBN material as claimed in claim 1, the binder material comprising at most about 90 weight percent Al.

3. PCBN material as claimed in claim 1, the binder material comprising at least 1 weight percent Co and at most 12 weight percent Co.

4. PCBN material as claimed in claim 1, in which the binder material comprises an iron group element and W, the molar ratio of the iron group element to W being at least 1 to 1 and at most 3 to 1 in the binder material.

5. PCBN material as claimed in claim 1, the binder material including aluminium nitride.

6. PCBN material as claimed in claim 1, the binder material including tungsten boride.

7. PCBN material as claimed in claim 1, the binder material including aluminium nitride and tungsten boride.

8. PCBN material as claimed in claim 1, the binder material being substantially free of aluminium diboride.

9. A tool element for machining a workpiece, comprising PCBN material as claimed in claim 1.

10. A method of using PCBN material as claimed in claim 1, the method including providing a tool element comprising the PCBN material and using the tool element to machine a workpiece comprising a ferrous material.

11. A method as claimed in claim 10, in which the workpiece comprises cast iron material comprising at least 10 weight percent Cr.

12. A method as claimed in claim 10, in which the workpiece comprises steel comprising at least 12 weight percent Mn.

13. A method as claimed in claim 10, in which the workpiece comprises tool steel.

14. A method as claimed in claim 10, in which the workpiece comprises tungsten carbide.

15. A method as claimed in claim 10, including rough turning the workpiece.

16. A method as claimed in claim 10, in which the workpiece contains porosity.

17. A method as claimed in claim 10, in which the workpiece contains slag.

18. A method as claimed in claim 10, in which the workpiece contains silicate particles.

* * * * *